May 7, 1963

T. A. PERLS ETAL 3,088,670

PYROELECTRIC SQUARING ELEMENT

Filed March 18, 1960

INVENTORS
THOMAS A. PERLS
JAN J. HARTOG
BRENTON L. MATTES
BY George C. Sullivan
Agent May 7, 1963 T. A. PERLS ETAL 3,088,670
PYROELECTRIC SQUARING ELEMENT
Filed March 18, 1960 4 Sheets-Sheet 2

INVENTORS
THOMAS A. PERLS
JAN J. HARTOG
BRENTON L. MATTES
BY
George C. Sullivan
Agent INVENTORS
THOMAS A. PERLS
JAN J. HARTOG
BRENTON L. MATTES
BY
George C. Sullivan
Agent May 7, 1963 T. A. PERLS ETAL 3,088,670
PYROELECTRIC SQUARING ELEMENT
Filed March 18, 1960 4 Sheets-Sheet 4

INVENTORS
THOMAS A. PERLS
JAN J. HARTOG
BRENTON L. MATTES
BY
Agent

United States Patent Office 3,088,670
Patented May 7, 1963

3,088,670
PYROELECTRIC SQUARING ELEMENT
Thomas A. Perls, Los Altos, and Jan J. Hartog and Brenton L. Mattes, Palo Alto, Calif., assignors to Lockheed Aircraft Corporation, Burbank, Calif.
Filed Mar. 18, 1960, Ser. No. 16,071
11 Claims. (Cl. 235—193)

This invention relates generally to devices for use in analog computing applications, and more particularly to a simple and compact pyroelectric squaring device capable of providing an output signal which is substantially the true instantaneous square of the input signal applied thereto.

In analog computing systems it is often necessary to provide means for obtaining an output signal corresponding to the instantaneous square of a given signal, without introducing the given signal itself or any other components into the output signal. Thus, conventional types of non-linear devices which generate the square of an input signal along with other signals are not satisfactory for use in analog computer applications where only the instantaneous square of a given signal is desired. As a result, it has been found necessary to employ relatively complex forms of electronic circuitry for this purpose, and most of these provide only a poor approximation.

Accordingly, it is the broad object of the present invention to provide improved means and methods for squaring a given signal.

A more specific object of this invention is to provide a pyroelectric squaring device and system which are capable of producing an output signal substantially corresponding to the true instantaneous square of an input signal applied thereto without introducing any extraneous components into the output signal.

A further object of this invention is to provide a pyroelectric squaring device capable of producing an output signal substantially corresponding to the true instantaneous square of an input signal applied thereto over a wide frequency range, particularly at the higher frequencies.

An additional object of this invention is to provide the means and devices of the aforementioned objects in simple and highly miniaturized form with a minimum of necessary components.

In accordance with the present invention, the pyroelectric effect is advantageously employed to provide a new type of squaring device of remarkable simplicity and compactness, which is operable over a wide frequency range, particularly at the higher frequencies. We have discovered that if a heater element and symmetrically located output electrodes are provided in contact with the surface of a suitably polarized piece of pyroelectric material, then an output can be obtained across a properly chosen load resistor connected between these output electrodes which is substantially proportional to the true instantaneous square of the input current flowing through the heater element.

The specific nature of the invention as well as other objects, uses and advantages thereof will clearly appear from the following description and from the accompanying drawing in which.

Like numerals designate like elements throughout the figures of the drawing.

Figure 1:
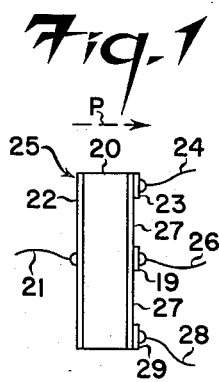
FIGS. 1 and 2 are respectively side and front views of an embodiment of a single-element pyroelectric squaring device, in accordance with the invention.
Figure 2:
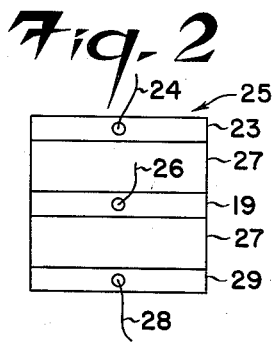

Referring now to FIGS. 1 and 2 illustrating an embodiment of a pyroelectric squaring device 25 in accordance with the invention, a rectangular slab of pyroelectric material 20 has its faces coated with thin metallic layers 22 and 27. Since the metal layer 22 serves as an electrode while the metal layer 27 serves as a heating element, the metal layer 22 is preferably a relatively high conductivity metal such as copper while the metal layer 27 is preferably a low conductivity metal such as Nichrome. Ideally the heater element 27 should have a low electrical conductivity and a high thermal conductivity. An electrical lead wire 21 is preferably connected to the central point of the metal layer 22 and metal strips 23, 19 and 29 are symmetrically formed on the metal layer 27 at the edges and center thereof as shown in FIG. 2. These strips 23, 19 and 29 are preferably of high conductivity metal and serve as electrodes. To each of the strips 23, 19 and 29 are soldered an electric lead wire 24, 26 and 28, respectively.

The pyroelectric material 20 may be PZT-4, a polarized lead zirconate-titanate composition available from the Clevite Corporation. Other pyroelectric materials such as barium titanate may also be used. The direction of polarization of the pyroelectric material 20 is preferably chosen to be perpendicular to the faces thereof as indicated by the dashed arrow P in FIG. 1. The thin layers of metal 22 and 27 and the strips 23, 19 and 29 may be formed by evaporation, by means of conductive paint or by means of any other suitable metal deposition technique.

The material 20 possesses the characteristic of pyroelectricity which is "electrification produced on various crystals by change of temperature," Webster's Third New International Dictionary of the English Language Unabridged, G. & C. Merriam Company, Springfield, Massachusetts, 1961. When the temperature T of a body is changed with time $t$ at a rate $$\frac{dT}{dt}$$

and that body is pyroelectric material, the electrical charge Q within the body will change by an amount $$\frac{dQ}{dt}$$

which rate is proportional to the time rate of change of temperature. If electrodes are placed on the body of pyroelectric material along its axis of polarization, a current $I_0$ may be drawn from the electrode which current is equal to $$\frac{dQ}{dt}$$

Figure 3:
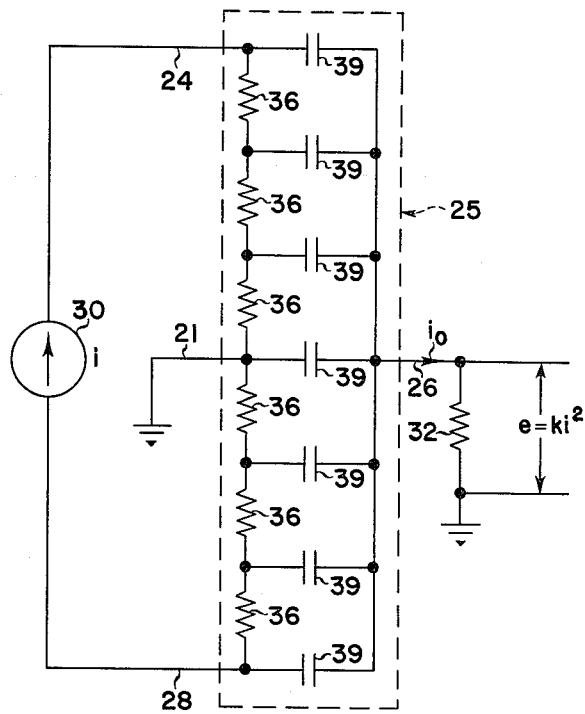
FIG. 3 is a circuit diagram showing an approximate equivalent electronic representation of the pyroelectric squaring device of FIGS. 1 and 2 in an operating circuit.

FIG. 3 is a circuit diagram representing the approximate electronic equivalent circuit of the device of FIGS. 1 and 2. The components within the dashed line 25 represent the pyroelectric device 25 of FIGS. 1 and 2. The signal to be squared is represented by the current $i$ from a current generator 30 connected between the leads 24 and 28 of the pyroelectric device 25. If the signal to be squared is not in current form it can be converted to a current in a variety of well known ways. The resistors 36 approximate the distributed resistance of the metal layer 27 which serves as the heating element, and the capacitors 39 represent the distributed capacitance between the metal layer 27 and the metal layer 22. Since only six of the resistors 36 and the capacitors 39 are shown to represent the distributed resistances and capacitances of the device of FIGS. 1 and 2, the equivalent circuit of FIG. 3 is only approximate.

The metal layer 22 to which the wire 21 is connected and the strip electrode 19 to which the wire 26 is connected serve as the output electrodes of the device and are connected across a properly chosen load resistor 32, the wire 21 and the side of the resistor 32 to which it is connected being connected to circuit ground. The proper choice of the load resistor 32 is important as will hereinafter be explained.

The operation of the pyroelectric device of FIGS. 1 and 2 may now be described. The signal $i$ which is to be squared flows through the heater element formed by the metal layer 27 generating heat at a rate proportional to $i^2$. This heat per unit time is transferred to the pyroelectric material 20 by direct thermal contact and is absorbed thereby, tending to raise its temperature. In accordance with pyroelectric action, charges of opposite sign are generated across the output lead wires 21 and 26 in response to changes in temperature. The generated charge is then applied to the output circuit made up of the load resistor 32 in series with the capacitance of the pyroelectric material 20 measured between the lead wires 21 and 26. This capacitance will hereinafter be referred to as the pyroelectric capacitance.

In the present invention, the magnitudes of the load resistor 32 and the pyroelectric capacitance are chosen sufficiently small so that the time constant of the output circuit causes the charge generated by changes in the temperature of the pyroelectric material 20 to produce an output current $i_0$ which is substantially proportional to the rate of change of the charge generated, and consequently, to the rate of change of the temperature of the pyroelectric material 20. Across the load resistor 32, therefore, an output signal $e=ki^2$ is obtained which is proportional to the instantaneous square of the input current $i$, $k$ being a constant. Because the output signal is proportional to the rate of change of temperature of the pyroelectric material and not to the change of temperature, it is not necessary to have an appreciable temperature change in order to obtain an output signal proportional to the instantaneous square of the input signal. This is of considerable importance since the heat capacity of the pyroelectric material in such a squaring operation becomes much less significant as far as frequency response is concerned and a much higher frequency response is thereby obtainable than would otherwise be possible.

Of course, the frequency response of a pyroelectric squaring device such as shown in FIGS. 1 and 2 is also dependent upon the heat capacity of the heater element made up of the metal layer 27, and the inherent response time of pyroelectric action. We have found that heat capacity of the heater element can be made very small by reducing the thickness of the metal layer 27, and the inherent response time of pyroelectric action has been observed to be quite fast for example, less than 1 microsecond. As a result, we have found that the frequency response of a pyroelectric device such as shown in FIGS. 1 and 2 is for all practical purposes dependent upon the R-C time constant of the output circuit formed by the load resistor 32 and the pyroelectric capacitance up to a frequency where the response time of pyroelectric action is significant, which is expected to be as high as 3 megacycles per second. In practice, the time constant of the output circuit is chosen in conjunction with the maximum frequency F to be squared so that $1/2\pi R_L C$ is less than F, where $R_L$ is the load resistor 32 and C is the pyroelectric capacitance measured between the output lead wires 21 and 26.

Now considering the operation of the pyroelectric squaring device of FIGS. 1 and 2 in more detail, it will be appreciated that it is not usually desirable that the input signal appear in the output. To prevent any such feedthrough of the input signal $i$, a symmetrical construction is used such that the input current $i$ is balanced out in the output. From FIG. 3, it will be understood that if a symmetrical construction is used as shown in FIGS. 1 and 2, the resistors 36 and the capacitors 39 will all be equal, and the circuit will act as a type of bridge so that no portion of the input signal will appear across the output leads 21 and 26. To accomplish this, the device of FIGS. 1 and 2 is constructed substantially identical on both sides of a plane passing through the center of the strip 19 and perpendicular thereto.

Figure 4:
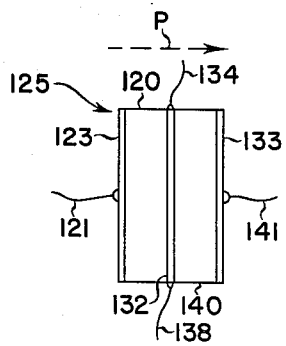
FIGS. 4 and 5 are respectively side and front views of an embodiment of a double-element pyroelectric squaring device, in accordance with the invention.
Figure 5:
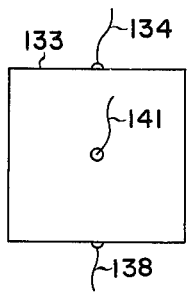
Figure 6:
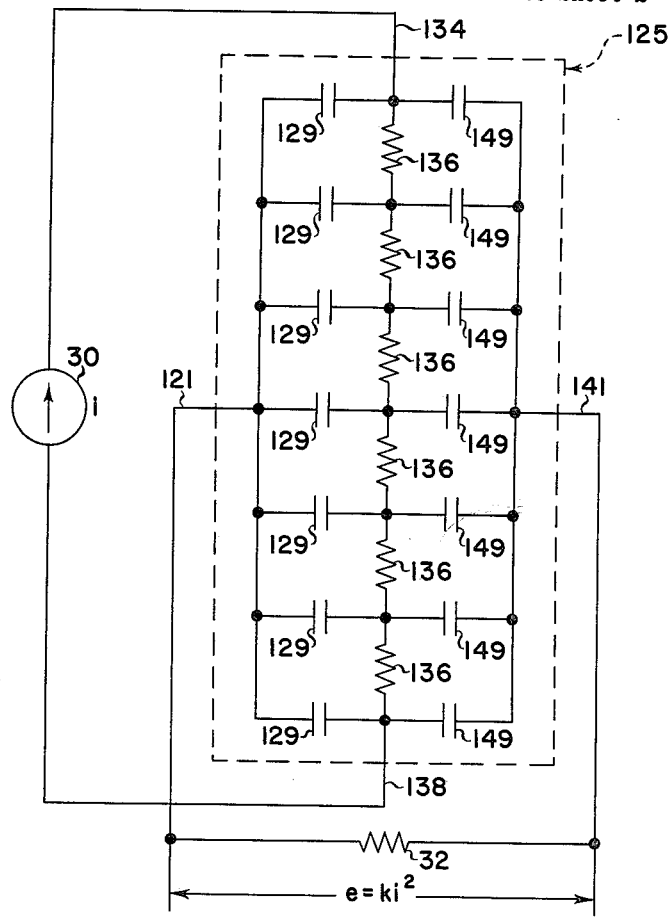
FIG. 6 is a circuit diagram showing an approximate equivalent electronic representation of the squaring device of FIGS. 4 and 5 in an operating circuit.

In FIGS. 4 and 5 a modified version of a pyroelectric device 125 in accordance with the invention is shown in which two slabs of pyroelectric material 120 and 140 are used. FIG. 6 is an approximate equivalent circuit of this modified version. Sandwiched between these two slabs 120 and 140 is a metal layer 132, preferably of a metal of relatively low conductivity such as Nichrome, which serves as the heater element. Electrical lead wires 134 and 138 are soldered to opposite ends of the metal layer 132 to permit the flow of the input current $i$ thereto. The outer surfaces of the slabs 120 and 140 have layers of metal 123 and 133 of relatively high conductivity coated thereon which serve as the output electrodes of the device. At the center of these metal layers 123 and 133 are soldered electrical lead wires 121 and 141. The direction of polarization of the pyroelectric slabs 120 and 140 is shown by the dashed arrow P in FIG. 4.

Now referring to FIG. 6 which is the equivalent circuit of the device of FIGS. 4 and 5, the resistors 136 represent the distributed resistance of the metal layer 132 serving as the heater element in the same manner as the resistors 36 represented the distributed resistance of the metal layer 27 in the device of FIGS. 1 and 2. Similarly the capacitors 129 and 149 in FIG. 6 respectively represent the distributed capacitance between the metal layer 132 and the electrode metal layers 123 and 133. As was the case in the equivalent circuit of FIG. 3, this circuit is only approximate since it only shows three elements to approximate the effect of these distributed resistances and capacitances.

The operation of the device of FIGS. 4 and 5 is essentially the same as that of FIGS. 1 and 2. However, the construction of FIGS. 4 and 5 has the advantage that because of its inherent simplicity and the ease with which symmetry can be obtained, it is much easier to balance out the input current $i$ in the output. The construction of a pyroelectric device in accordance with FIGS. 4 and 5, therefore, is much more convenient and considerably less critical.

Figure 7:
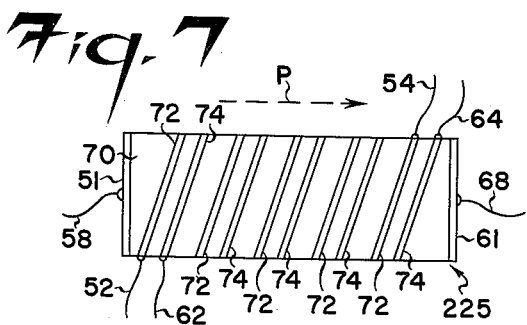
FIGS. 7 and 8 are respectively longitudinal and end views of another version of a pyroelectric squaring device, in accordance with the invention.
Figure 8:
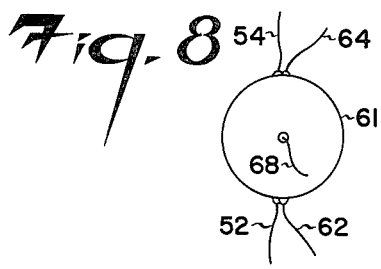

As mentioned previously, because the desired output signal $e=ki^2$ is proportional to the rate of change of temperature of the pyroelectric material, the heat capacity of the pyroelectric material is much less significant as far as frequency response is concerned. It thus becomes possible to provide a pyroelectric squaring device 225 having a particularly advantageous construction, as shown in FIGS. 7 and 8. In FIG. 7, the pyroelectric material 70 is in the form of a cylinder and has metal layers 51 and 61 on the ends thereof serving as electrodes. Electrical lead wires 58 and 68 are respectively connected to the electrodes 51 and 61 to provide electrical contact thereto. The heating element is now provided by two thin metallic strips 72 and 74 in contact with the surface of the cylindrical pyroelectric material 70 in the same way as a coil might be printed on the surface thereof. These metal strips 72 and 74 are wound relatively close together so that current flow therethrough in opposite directions effectively cancels out any magnetic field developed, thereby eliminating inductive effects. The ends of the metal strip 72 have electrical lead wires 52 and 54 connected thereto while the ends of the metal strip 74 have electrical lead wires 62 and 64 connected thereto as shown in FIG. 7. The dashed arrow P in FIG. 7 represents the direction of polarization of the pyroelectric material 70, this direction being parallel to the longitudinal axis of the cylindrical pyroelectric material 70.

The metal strips 72 and 74 may be formed on the surface of the pyroelectric cylinder 70 in a variety of ways. For example, grooves could be scribed in the surface of the pyroelectric material corresponding to the proper locations of the strips 72 and 74. The entire surface of the cylinder of pyroelectric material 70 could then be coated with a metal of suitable conductivity by any well known metal deposition means. If the surface is then turned down on a lathe by an amount less than the depth of the grooves which were scribed thereon, then the only metal portions remaining would be in the grooves and would effectively result in obtaining the metal strips 72 and 74 as shown in FIG. 7.

Figure 9:
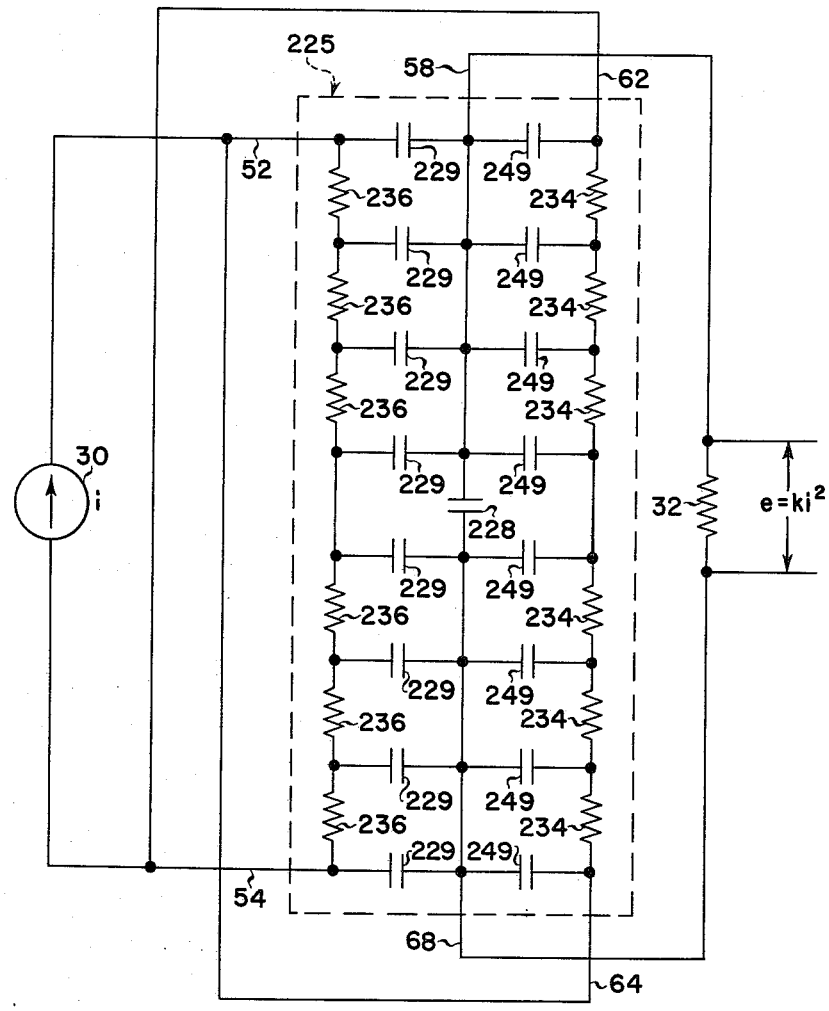
FIG. 9 is a circuit diagram showing an approximate equivalent electronic representation of the squaring device of FIGS. 7 and 8 in an operating circuit.

The circuit of FIG. 9 approximates the pyroelectric device 225 of FIGS. 7 and 8 and shows how the device 225 is connected for squaring. As was the case with the resistors 36 and 136 in the devices of FIGS. 1–2, and 4–5, the resistors 234 and 236 respectively refer to the distributed resistance of the strips 72 and 74, while the capacitors 229 and 249 approximate the distributed capacitance between the metal strips 72 and 74 and the electrodes 51 and 61. The capacitor 228 in FIG. 9 represents the capacitance between the electrodes 51 and 61 which appears in a circuit as shown in FIG. 9. The metal strips 72 and 74 have their respective lead wires 52, 54 and 62, 64 connected so that the input current $i$ flows through the strips 72 and 74 in opposite directions, as shown in FIG. 9. By so doing inductive effects are eliminated and effective symmetry can be achieved, as described previously in connection with FIGS. 1–3, so that the input current $i$ is balanced out and does not appear in the output.

It should be noted that the solenoidal construction of the device 225 of FIGS. 7 and 8 takes advantage of the fact that the heat capacity of the pyroelectric material does not significantly affect the frequency response of the squaring operation. Increasing the length of the solenoid permits the pyroelectric capacitance measured between the output lead wires 58 and 68 to be reduced to a small value without disproportionately increasing the total volume of pyroelectric material. An additional advantage obtained by increasing the volume of pyroelectric material 70 is that the low frequency response of the device 225 is considerably improved without any significant effect on the high frequency response. This can be seen from the following considerations. As was mentioned previously the output current is proportional to the rate of change of temperature of the pyroelectric material. It is only necessary, therefore, to establish a constant rate of change of temperature, that is, a constant heat input rate, to have the output current follow a step input. Thus, if the pyroelectric material has a volume so that it does not approach thermal equilibrium too rapidly, a much better low frequency response will be obtained.

In using the pyroelectric squaring devices of this invention described in the various figures of the drawing, the particular application will dictate actual operating conditions. For example, if the device is to be used continuously and the zero frequency component is not required in the output, the element should be operated in an environment of thermal equilibrium with its surroundings and suitable heat radiation or cooling means employed as desired. If the output of such a system is used with circuitry which filters out components below about 1 cycle per second or even 0.1 cycle per second, the device will operate continuously with substantially true squaring characteristics above this frequency.

If the pyroelectric device is to operate continuously, the zero frequency component obviously cannot be provided, since a condition of thermal equilibrium will eventually be reached. However, if only intermittent operation is required, an effective zero frequency component can satisfactorily be provided by providing no cooling and increasing the volume of pyroelectric material accordingly.

All of the devices described in connection with this invention are advantageous for use as squaring devices for obtaining substantially the true instantaneous square of a given signal. In using these elements it should be realized that there is considerable power loss involved and the efficiency of the unit may only be of the order of $10^{-12}$ to $10^{-9}$. Thus, a current gain of $10^4$ to $10^6$ may have to be supplied in some applications, but this is well within the state of the art of simple transistor amplifiers and usually can be provided with much greater ease than is necessary for conventional squaring circuits. For this reason, the low efficiency of the pyroelectric squaring device of this invention is not a serious disadvantage.

Figure 10:
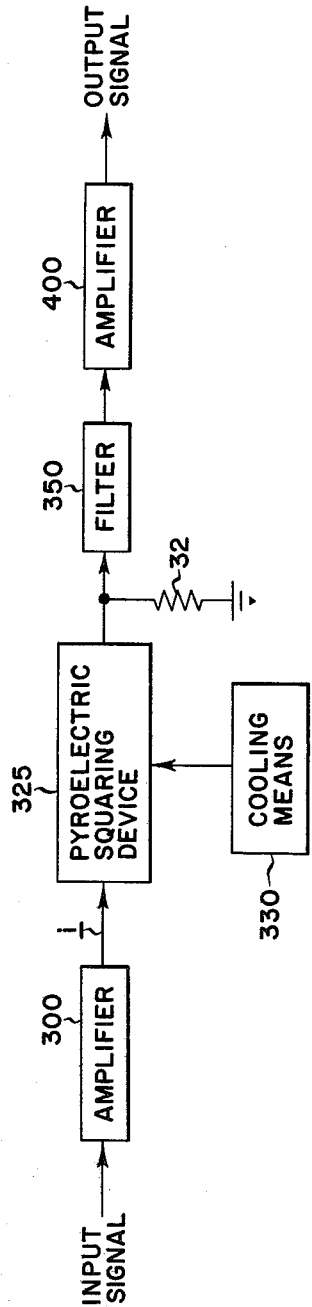
FIG. 10 is a block diagram showing how a pyroelectric squaring device can be employed in an actual system.

FIG. 10 is a block diagram illustrating how a pyroelectric squaring element may be incorporated in a typical operating system in accordance with the invention. An input signal to be squared is fed to an amplifier 300 where it is amplified to a suitable level and converted to a current signal $i$ for feeding to the pyroelectric squaring device 325.

For continuous operation where the zero frequency component is not required suitable cooling means 330 is provided, such as a controlled environment, or a fan which blows cool air over the device. For intermittent operation where the zero frequency component is required, the cooling means 330 is omitted.

The pyroelectric squaring device 325 produces an output signal across the resistor 32 substantially corresponding to the true instantaneous square of the input current $i$ over the operating frequency range of the device 325. Outside of this operating frequency range, undesirable components may exist and for this reason the squared output from the pyroelectric squaring device 325 is fed to a filter 350 which is adapted to pass only those frequencies of the output signal in the operating range where true squaring is obtained. The amplifier 400 then amplifies the output of the filter 350 to provide an output signal having a desired level. Obviously, the filter 350 could be eliminated and the frequency response of the amplifier 400 adjusted to pass only the required range of frequencies.

It is to be understood that the present invention is not limited to the embodiments described and illustrated herein, since many modifications and variations in the construction and arrangement thereof may be made without departing from the scope of our invention as defined in the appended claims.

We claim as our invention:

1. A pyroelectric squaring device comprising a piece of polarized pyroelectric material, electrically conductive means through which a current corresponding to the signal to be squared is passed, said conductive means adapted to cooperate with said material to transfer thereto the heat generated by current flow through said conductive means, output electrodes on said material, said electrodes being disposed in planes generally normal to the direction of polarization of said piece, and means connected to said electrodes for extracting therefrom an output current proportional to the rate of change of temperature of said material.

2. The invention in accordance with claim 1 wherein said output electrodes are symmetrically located on said pyroelectric material with respect to said electrical conductive means so that the signal to be squared is prevented from appearing across said output electrodes.

3. A pyroelectric device for use in obtaining the instantaneous square of a given signal, said device comprising a piece of polarized pyroelectric material, a conductive metal element in contact with said material and serving as a heater element, means for passing a current through said metal element corresponding to the signal to be squared, and output electrodes in contact with said material located at positions spaced along and generally normal to the direction of polarization thereof.

4. The invention in accordance with claim 3 wherein said metal element is a thin layer of metal in contact with the surface of said material.

5. A pyroelectric squaring device comprising a piece of polarized pyroelectric material, electrical conductive means in contact with said material, means connected to said electrical conductive means for passing a current therethrough corresponding to the signal to be squared, said conductive means adapted to cooperate with said material to transfer thereto the heat generated by said conductive means, output electrodes in contact with said material and symmetrically located with respect to said conductive means so that the signal to be squared is prevented from appearing thereacross, said electrodes being disposed in planes generally normal to the direction of polarization of said piece, and a load resistor connected across said electrodes, said load resistor being chosen in conjunction with the capacitance across said output electrodes so that the output voltage appearing across said load resistor is substantially proportional to the rate of change of temperature of said material over the range of frequencies of the signal to be squared.

6. The invention in accordance with claim 5, wherein the load resistor $R_L$ and the capacitance C across said output electrodes are chosen so that $\frac{1}{2}\pi R_L C$ is less than the maximum frequency component of the signal to be squared.

7. A pyroelectric squaring device comprising a slab of pyroelectric material polarized in a direction substantially perpendicular to the faces of said slab, a thin conductive metal layer coated on one face of said slab and serving as a heater element, means for passing a current corresponding to the signal to be squared through said metal layer, output electrodes symmetrically provided on opposite sides of said slab so as to prevent the signal to be squared from appearing across said output electrodes, and a load resistor connected across said output electrodes, said load resistor being chosen in conjunction with the capacitance across said output electrodes so that the voltage output appearing across said load resistor is substantially proportional to the rate of change of temperature of said material over a predetermined range of frequencies.

8. A pyroelectric squaring device comprising first and second substantially identical slabs of pyroelectric material polarized in a direction substantially perpendicular to the faces thereof, a thin conductive metal layer sandwiched between said slabs, said metal layer serving as a heating element, means for passing a current corresponding to the signal to be squared through said metal layer, conductive metal layers formed on the outer faces of said slabs which serve as output electrodes, and a load resistor connected between said output electrodes, said load resistor being chosen in conjunction with the capacitance across said output electrodes so that the voltage output appearing across said load resistor is substantially proportional to the rate of change of temperature of said material over a predetermined range of frequencies.

9. A pyroelectric squaring device comprising a cylinder of pyroelectric material polarized in a direction substantially parallel to the axis of said cylinder; first and second conductive helical metal strips formed on the surface of said cylinder in close proximity to one another, said strips serving as heater elements, means for passing a current corresponding to the signal to be squared through said metal strips in opposite directions, conductive metal layers formed on the ends of said cylinder which serve as output electrodes, and a load resistor connected between said output electrodes, said load resistor being chosen in conjunction with the capacitance across said output electrodes and the volume of said cylinder so that the voltage output appearing across said load resistor is substantially proportional to the rate of change of temperature of said material over a predetermined range of frequencies.

10. Means for generating an electrical signal which is proportional to the square of an input current comprising a body of polarized pyroelectric material having two faces on planes substantially normal to the direction of polarization of said body, conductive electrodes on said faces, resistive means intermediate said faces for heating said body, and means for connecting the input current to said heating means.

11. Means for generating an electrical signal which is proportional to the square of an input current comprising a body of polarized pyroelectric material having two faces on planes substantially normal to the direction of polarization of said body, conductive electrodes on said faces, resistive means intermediate said faces for heating said body, said heating means being symmetrical with respect to a plane normal to the direction of polarization of said body and equidistant between said faces, and means for connecting the input current to said heating means.

References Cited in the file of this patent

UNITED STATES PATENTS

| | | |
|---|---|---|
| 2,857,569 | Gilbert et al. | Oct. 21, 1958 |
| 2,975,354 | Rosen | Mar. 14, 1961 |
| 2,979,551 | Pack | Apr. 11, 1961 |